United States Patent

[11] 3,585,453

| [72] | Inventor | Hisashi Kawai<br>Toyohashi-shi, Japan |
|---|---|---|
| [21] | Appl. No. | 826,530 |
| [22] | Filed | May 21, 1969 |
| [45] | Patented | June 15, 1971 |
| [73] | Assignee | Nippon Denso Company Limited<br>Kariya-shi, Japan |
| [32] | Priority | June 27, 1968 |
| [33] | | Japan |
| [31] | | 43/45340 |

[54] DEVICE FOR PROTECTING ELECTRICAL LOAD OF AUTOMOTIVE VEHICLES
4 Claims, 2 Drawing Figs.

[52] U.S. Cl. .................................................. 317/31,
307/10, 315/77, 317/9, 317/33
[51] Int. Cl. ....................................................... H02h 3/20
[50] Field of Search........................................... 307/10;
317/31, 33, 9 B; 315/77

[56] References Cited
UNITED STATES PATENTS

| 3,106,665 | 10/1963 | Byles............................. | 307/10 |
| 3,285,234 | 11/1966 | McLauchlin ................. | 307/10 X |
| 3,374,394 | 3/1968 | Miller............................ | 307/10 X |

*Primary Examiner*—James D. Trammell
*Attorney*—Cushman, Darby and Cushman

ABSTRACT: A device for protecting an electrical load of an automotive vehicle comprising a Zener diode connected to the output terminal of a power source circuit of the automotive vehicle, a switching circuit including a semiconductor element connected to said Zener diode so that said semiconductor element operates in response to flow of current across said Zener diode, and a control circuit for the electrical load such as a lamp, said control circuit having its input terminal connected to the output terminal of said switching circuit. In the device, an unusually high voltage generated in the power source circuit is instantaneously detected by the Zener diode and the switching circuit is thereby operated to forcedly cut off the control circuit for the electrical load so as to prevent any damage to the electrical load.

PATENTED JUN 15 1971

3,585,453

INVENTOR
Hisashi Kawai

BY Cushman, Darby & Cushman

ATTORNEYS

DEVICE FOR PROTECTING ELECTRICAL LOAD OF AUTOMOTIVE VEHICLES

BACKGROUND OF THE INVENTION

1. Field of the Invention

This invention relates to a device for protecting an electrical load of an automotive vehicle so as to prevent any damage to the electrical load such as a lamp due to an unusually high voltage generated in a power source circuit of the vehicle.

2. Description of the Prior Art 100 100 is

An unusually high voltage which is as high as 100 volts and in the form of a pulse having a pulse duration of the order of 100 msec. may appear temporarily in the power source circuit of an automotive vehicle even when the power source circuit is operating normally. Such trouble occurs in the event that a conductor led from the positive electrode terminal of the battery is disconnected or the positive electrode terminal of the battery or the terminal of an ammeter connected in series with the battery gets loose and is disengaged from its proper position. In such a case, large current due to the unusually high voltage flows momentarily to an electrical load of the vehicle. Such electrical load may be a lamp which is placed in its energized state to serve as a stop light or turn signal light.

SUMMARY OF THE INVENTION

It is a primary object of the present invention to provide a device for protecting an electrical load of an automotive vehicle comprising a Zener diode connected to the output terminal of a power source circuit of the vehicle, a switching circuit including a semiconductor element connected to said Zener diode so that said semiconductor element operates in response to flow of current across said Zener diode, and a control circuit for the electrical load such as a lamp, said control circuit having its input terminal connected to the output terminal of said switching circuit.

According to the present invention, an unusually high voltage which may be generated as a result of disengagement of the battery terminal or ammeter terminal in the power source circuit due to shock or the like is instantaneously detected by the Zener diode and the switching circuit is driven by the Zener diode to forcedly cut off the control circuit so as to cut off the supply of current to the electrical load such as a lamp for positively preventing any damage to the electrical load.

DESCRIPTION OF THE PREFERRED EMBODIMENT

Figure 1:
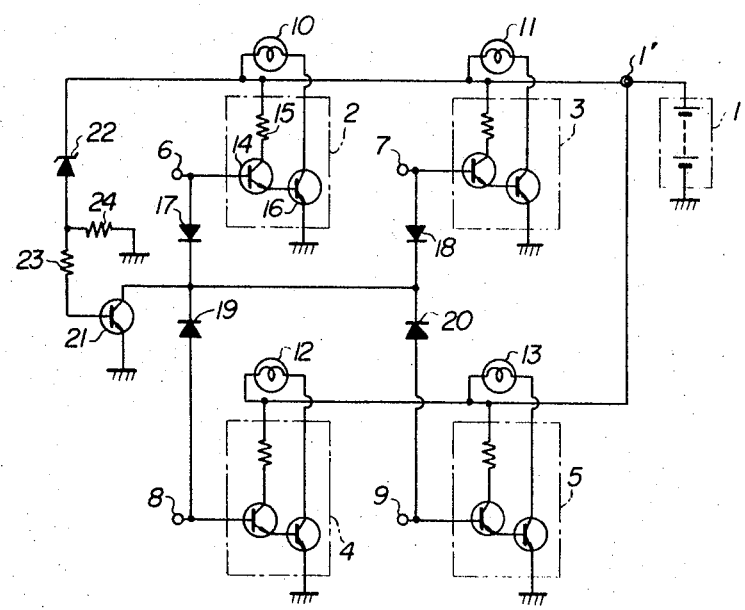
FIG. 1 is an electrical circuit diagram of an embodiment of the device according to the present invention.

Referring to FIG. 1, a power source circuit 1 has an output terminal 1' and is grounded at the other terminal thereof. Control circuits 2, 3, 4 and 5 of same structure are associated with a left-hand lamp 10 at the rear side of the vehicle, a right-hand lamp 11 at the rear side of the vehicle, a left-hand lamp 12 at the front side of the vehicle, and a right-hand lamp 13 at the front side of the vehicle, respectively. The control circuits 2, 3, 4 and 5 control the current flowing to the respective lamps 10, 11, 12 and 13, and have respective input terminals 6, 7, 8 and 9. The control circuit 2 includes two transistors 14, 16 and a resistor 15. The transistor 14 has its base connected to the input terminal 6 and its collector connected to one end of the resistor 15. The other end of the resistor 15 is connected to the output terminal 1' of the power source circuit 1. The transistor 16 has its base connected to the emitter of the transistor 14 and its emitter grounded. One end of the filament of the lamp 10 is connected to the collector of the transistor 16, while the other end of the filament of the lamp 10 is connected to the output terminal 1' of the power source circuit 1.

The structure of the control circuits 3, 4 and 5 is same as that of the control circuit 2. The lamps 10, 11, 12 and 13 operate as a turn signal light, stop light or parking light when a flash signal for turn signaling, stop signal or parking signal is applied to their input terminals 6, 7, 8 and 9.

Diodes 17, 18, 19 and 20 have their positive electrodes connected to the input terminals 6, 7, 8 and 9, respectively. The negative electrodes of these diodes 17, 18, 19 and 20 are connected in common to the collector of a transistor 21 whose emitter is grounded. A Zener diode 22 has its negative electrode connected to the output terminal 1' of the power source circuit 1 and its positive electrode to the junction of resistors 23, and 24. The other end of the resistor 23 is connected to the base of the transistor 21, while the other end of the resistor 24 is grounded. The transistor 21 constitutes a switching circuit which is controlled by the Zener diode 22.

Figure 2:
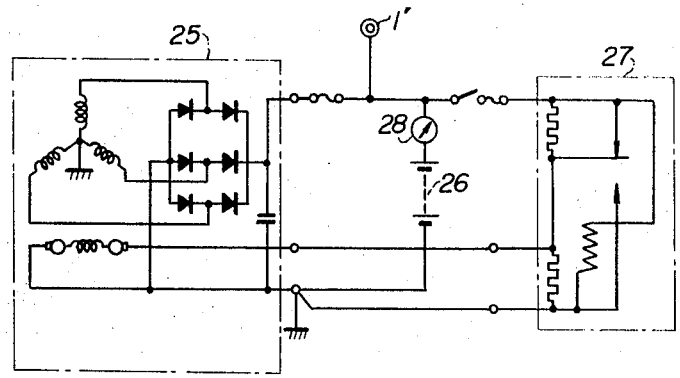
FIG. 2 is an electrical connection diagram showing the structure of the power source circuit shown in FIG. 1.

Referring to FIG. 2 showing the detailed structure of the power source circuit shown in FIG. 1, the power source circuit 1 includes an AC generator 25 with built-in diodes, a battery 26, a contact-type voltage regulator 27 and an ammeter 28.

The operation of the device will now be described. When a turn signal, stop signal or parking signal is applied to the input terminal 6 of the control circuit 2 for the lamp 10 in FIG. 1, current flows to the base of the transistor 14 to drive the transistor 14 into its conducting state so that collector current appears. Base current is supplied from the emitter of the transistor 14 to the transistor 16, and as a result, collector current of the transistor 16 flows into the filament of the lamp 10 to energize the lamp 10. That is, the lamp 10 is energized when a voltage is applied to the input terminal 6. Identical operation takes place in the other control circuits 3, 4 and 5. Suppose that the power source voltage is rated at 12 volts, then the Zener voltage of the Zener diode 22 is set at 19 volts. Thus, in the normal operation in which the power source voltage is lower than 19 volts, no current flows across the Zener diode 22 and hence no current flows through the resistor 23 to the base of the transistor 21, which is therefore kept at its cutoff state.

In the event that the terminal of, for example, the battery 26 or ammeter 28 should be disengaged from its proper position or the conductor should be disconnected for some reason such as a shock while the AC generator 25 shown in FIG. 2 is operating normally, the current charging the battery 26 is abruptly cut off with the result that an unusually high voltage of about 100 volts and in the form of a pulse having a pulse duration of the order of 100 msec. appears at the output terminal 1' of the power source circuit 1. The unusually high voltage is supplied to the conductor led out of the power source circuit 1. Suppose that, in such an instance, the lamps 10, 11, 12 and 13 are in their energized state to serve as a turn signal light, stop light or parking light. Then, an unusually high voltage is applied to the lamps 10, 11, 12 and 13 to cause flow of large current therethrough thereby to flow them.

Such a trouble can be eliminated by the device according to the present invention. In accordance with the present invention, current flows across the Zener diode 22 as soon as such unusually high voltage is generated. The current flows through the resistor 23 to supply base current to the transistor 21 thereby to drive the transistor 21 to its conducting state, whereupon the base voltage of the transistor 14 is reduced to substantially ground potential through the diode 17 so that the transistor 14 is cut off. At the same time, the transistor 16 is cut off to deenergize the lamp 10 thereby to prevent any damage to the lamp 10. Similarly, the diodes 18, 19 and 20 provide ground potential at the input terminals 7, 8 and 9 of the respective control circuits 3, 4 and 5 to deenergize the respective lamps 11, 12 and 13. Thus, the filaments of lamps 11, 12 and 13 are prevented from being destroyed. Needless to say, the transistors 14 and 16 have a breakdown voltage higher than 100 volts.

The resistor 24 acts to stabilize the operation of the transistor 21 by allowing flow therethrough of leakage current of the Zener diode 22 and transistor 21.

PNP transistors may be used in lieu of the NPN transistors employed in the control circuits 2, 3, 4 and 5 for the lamps 10, 11, 12 and 13. In this case, the switching circuit employing the transistor 21 controlled by the Zener diode 22 may be so arranged that the input voltage to the control circuits 2, 3, 4 and 5 may be forcedly increased to the power source voltage in response to occurrence of unusually high voltage. Further, in lieu of the transistor 21 constituting the switching circuit, other semiconductor element such as a silicon controlled rectifier may be employed.

I claim:

1. A device for protecting an electrical load of an automotive vehicle from unusually high voltages, said device comprising:

a Zener diode electrically connected to an output terminal of a power source circuit of the vehicle and adapted to conduct upon receiving an unusually high voltage from said power source, a switching circuit including a semiconductor element connected to said Zener diode so that said semiconductor element operates in response to the conduction of said Zener diode, and a control circuit for said electrical load said control circuit having output terminals electrically connected between one end of said load and said power circuit and an input terminal electrically connected to an output terminal of said switching circuit for electrically isolating said load from said power circuit upon detecting an unusually high voltage.

2. A device for protecting an electrical load as in claim 1, wherein said electrical load comprises at least one lamp.

3. A device for protecting an electrical load as in claim 1 wherein said load comprises a plurality of separate loads and including at least one of said control circuits for each of said separate loads and wherein the input terminal for each of the control circuits is connected to the output of said switching circuit through a diode for maintaining the isolation of said separate loads by preventing the flow of reverse current.

4. A device for protecting an electrical load as in claim 1, wherein said semiconductor element is connected to the output terminal of said power source circuit through said Zener diode and a first resistor, and wherein the junction point of said Zener diode and said first resistor is grounded through a second resistor.